United States Patent
Hua et al.

(10) Patent No.: US 11,403,022 B2
(45) Date of Patent: Aug. 2, 2022

(54) GROWING AND SPLITTING A DISK ARRAY BY MOVING RAID GROUP MEMBERS

(71) Applicant: EMC IP HOLDING COMPANY LLC, Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 16/891,116

(22) Filed: Jun. 3, 2020

(65) Prior Publication Data
US 2021/0382642 A1    Dec. 9, 2021

(51) Int. Cl.
*G06F 3/06*    (2006.01)

(52) U.S. Cl.
CPC .......... *G06F 3/0644* (2013.01); *G06F 3/0619* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 6,035,373 A * | 3/2000 | Iwata | ................... | G06F 3/0613 711/114 |
| 10,102,147 B1 * | 10/2018 | BenHanokh | .......... | G06F 12/128 |
| 10,146,447 B1 * | 12/2018 | Dong | ................... | G06F 11/1076 |
| 2003/0145167 A1 * | 7/2003 | Tomita | ................... | G06F 3/0689 711/113 |
| 2005/0063217 A1 * | 3/2005 | Shiraishi | ............. | G06F 11/1096 365/154 |
| 2005/0102551 A1 * | 5/2005 | Watanabe | ............. | G06F 3/0607 714/6.2 |
| 2007/0174333 A1 * | 7/2007 | Lee | ........................ | G06F 3/0689 |
| 2010/0191907 A1 * | 7/2010 | Ish | ....................... | G06F 11/1096 711/E12.001 |
| 2014/0351512 A1 * | 11/2014 | Xu | ........................ | G06F 3/0631 711/114 |

OTHER PUBLICATIONS

DataTech: RAID 5 Data recovery services p. 5, Mar. 31, 2022 (Year: 2022).*

(Continued)

*Primary Examiner* — Kaushikkumar M Patel
(74) *Attorney, Agent, or Firm* — Anderson Gorecki LLP

(57) ABSTRACT

In a storage system that implements RAID (D+P) protection groups a drive subset initially has (D+P) drives with (D+P) partitions. The drive subset is made to be symmetrical such that protection group members are symmetrically distributed in a matrix of drive rows and partition columns that represents the drive subset. A single new drive is added by partitioning the new drive with (D+P) partitions, moving existing protection group members from a selected partition of the (D+P) drives to partitions of the single new drive by rotating the selected partition by 90 degrees, and adding protection group members of a new protection group to the vacated selected partition of the (D+P) drives. The process is repeated until (D+P) new drives have been added in single drive increments. The resulting drive subset is then split by forming a non-symmetric drive subset from the (D+P) drives and forming a symmetric drive subset from the (D+P) new drives.

14 Claims, 13 Drawing Sheets

(56) References Cited

OTHER PUBLICATIONS

Lee et al. (Performance Consequences of Parity Placement in Disk Arrays) pp. 190-199. ACM 0-89791-380-9 (Year: 1991).*
Symantec definition: Left-symmetric Layout. Jun. 2, 2020, p. 1 (Year: 2020).*
UFS Explorer: Data distribution and recovery peculiarities on different RAID levels, p. 16 (Year: 2022).*
Zoubek et al. Generic RAID reassembly using block-level entropy: pp. 544-554 (Year: 2016).*

* cited by examiner

| disk\part | P0 | P1 | P2 | P3 | P4 |
|---|---|---|---|---|---|
| D0 | 0 | 1 | 2 | 3 | 4 |
| D1 | 0 | 1 | 2 | 3 | 4 |
| D2 | 0 | 1 | 2 | 3 | 4 |
| D3 | 0 | 1 | 2 | 3 | 4 |
| D4 | 0 | 1 | 2 | 3 | 4 |

Drive Subset Matrix 300

Figure 3

| disk\part | P0 | P1 | P2 | P3 | P4 |
|---|---|---|---|---|---|
| D0 | 0 | 1 | 2 | 3 | 4 |
| D1 | 1 | 2 | 3 | 4 | 0 |
| D2 | 2 | 3 | 4 | 0 | 1 |
| D3 | 3 | 4 | 0 | 1 | 2 |
| D4 | 4 | 0 | 1 | 2 | 3 |

Symmetric Drive Subset Matrix 302

Figure 4

New Protection Group 5
Created in Vacated Partition 0

| disk\part | P0 | P1 | P2 | P3 | P4 |
|---|---|---|---|---|---|
| D0 | 5 | 1 | 2 | 3 | 4 |
| D1 | 5 | 2 | 3 | 4 | 0 |
| D2 | 5 | 3 | 4 | 0 | 1 |
| D3 | 5 | 4 | 0 | 1 | 2 |
| D4 | 5 | 0 | 1 | 2 | 3 |
| D5 | 0 | 1 | 2 | 3 | 4 |

Drive Subset Matrix 304

Figure 6

| disk\part | P0 | P1 | P2 | P3 | P4 |
|---|---|---|---|---|---|
| D0 | 5 | 6 | 2 | 3 | 4 |
| D1 | 5 | 6 | 3 | 4 | 0 |
| D2 | 5 | 6 | 4 | 0 | 1 |
| D3 | 5 | 6 | 0 | 1 | 2 |
| D4 | 5 | 6 | 1 | 2 | 3 |
| D5 | 0 | 1 | 2 | 3 | 4 |
| D6 | 1 | 2 | 3 | 4 | 0 |

Drive Subset Matrix 306

Figure 7

| disk\part | P0 | P1 | P2 | P3 | P4 |
|---|---|---|---|---|---|
| D0 | 5 | 6 | 7 | 3 | 4 |
| D1 | 5 | 6 | 7 | 4 | 0 |
| D2 | 5 | 6 | 7 | 0 | 1 |
| D3 | 5 | 6 | 7 | 1 | 2 |
| D4 | 5 | 6 | 7 | 2 | 3 |
| D5 | 0 | 1 | 2 | 3 | 4 |
| D6 | 1 | 2 | 3 | 4 | 0 |
| D7 | 2 | 3 | 4 | 0 | 1 |

Drive Subset Matrix 308

Figure 8

| disk\part | P0 | P1 | P2 | P3 | P4 |
|---|---|---|---|---|---|
| D0 | 5 | 6 | 7 | 8 | 4 |
| D1 | 5 | 6 | 7 | 8 | 0 |
| D2 | 5 | 6 | 7 | 8 | 1 |
| D3 | 5 | 6 | 7 | 8 | 2 |
| D4 | 5 | 6 | 7 | 8 | 3 |
| D5 | 0 | 1 | 2 | 3 | 4 |
| D6 | 1 | 2 | 3 | 4 | 0 |
| D7 | 2 | 3 | 4 | 0 | 1 |
| D8 | 3 | 4 | 0 | 1 | 2 |

Drive Subset Matrix 310

Figure 9

| disk\part | P0 | P1 | P2 | P3 | P4 |
|---|---|---|---|---|---|
| D0 | 5 | 6 | 7 | 8 | 9 |
| D1 | 5 | 6 | 7 | 8 | 9 |
| D2 | 5 | 6 | 7 | 8 | 9 |
| D3 | 5 | 6 | 7 | 8 | 9 |
| D4 | 5 | 6 | 7 | 8 | 9 |
| D5 | 0 | 1 | 2 | 3 | 4 |
| D6 | 1 | 2 | 3 | 4 | 0 |
| D7 | 2 | 3 | 4 | 0 | 1 |
| D8 | 3 | 4 | 0 | 1 | 2 |
| D9 | 4 | 0 | 1 | 2 | 3 |

Drive Subset Matrix 312

Figure 10

| disk\part | P0 | P1 | P2 | P3 | P4 |
|---|---|---|---|---|---|
| D0 | 5 | 6 | 7 | 8 | 9 |
| D1 | 5 | 6 | 7 | 8 | 9 |
| D2 | 5 | 6 | 7 | 8 | 9 |
| D3 | 5 | 6 | 7 | 8 | 9 |
| D4 | 5 | 6 | 7 | 8 | 9 |

Drive Subset Matrix 314

| disk\part | P0 | P1 | P2 | P3 | P4 |
|---|---|---|---|---|---|
| D5 | 0 | 1 | 2 | 3 | 4 |
| D6 | 1 | 2 | 3 | 4 | 0 |
| D7 | 2 | 3 | 4 | 0 | 1 |
| D8 | 3 | 4 | 0 | 1 | 2 |
| D9 | 4 | 0 | 1 | 2 | 3 |

Symmetric Drive Subset Matrix 316

Figure 11

| disk\part | P0 | P1 | P2 | P3 | P4 |
|---|---|---|---|---|---|
| D0 | 5 | 6 | 7 | 8 | 9 |
| D1 | 5 | 6 | 7 | 8 | 9 |
| D2 | 5 | 6 | 7 | 8 | 9 |
| D3 | 5 | 6 | 7 | 8 | 9 |
| D4 | 5 | 6 | 7 | 8 | 9 |

Drive Subset Matrix 314

| disk\part | P0 | P1 | P2 | P3 | P4 |
|---|---|---|---|---|---|
| D5 | 10 | 1 | 2 | 3 | 4 |
| D6 | 10 | 2 | 3 | 4 | 0 |
| D7 | 10 | 3 | 4 | 0 | 1 |
| D8 | 10 | 4 | 0 | 1 | 2 |
| D9 | 10 | 0 | 1 | 2 | 3 |
| D10 | 0 | 1 | 2 | 3 | 4 |

Drive Subset Matrix 318

GROWING AND SPLITTING A DISK ARRAY BY MOVING RAID GROUP MEMBERS

TECHNICAL FIELD

The subject matter of this disclosure is generally related to electronic data storage, and more particularly to increasing the storage capacity of a data storage system that implements protection groups.

BACKGROUND

Protection groups help to avoid data loss by enabling a failed member to be reconstructed. In a typical data storage system, the disk drives are organized as members of a redundant array of independent drives (RAID) protection group. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails.

It is sometimes necessary to increase the total storage capacity of a data storage system because the existing storage capacity becomes fully utilized. The storage capacity of a data storage system that uses individual drives as protection group members is increased by adding a new protection group, i.e. (D+P) drives for a RAID (D+P) protection group. For example, a storage system that implements RAID-5 (4+1) may be scaled-up in increments of five new drives. Similarly, a RAID-5 (3+1) may be scaled-up in increments of four new drives. One drawback of scaling storage capacity in increments of (D+P) new drives is that it may introduce excess storage capacity that will not be utilized within a reasonable timeframe. This drawback is becoming more troublesome as the storage capacity of individual drives increases due to technological advancements. More specifically, as the storage capacity and cost of drives increases, the amount of excess storage capacity and cost associated with adding D+P drives to a storage system also increase, particularly for larger values of (D+P).

SUMMARY

All examples, aspects and features mentioned in this document can be combined in any technically possible way.

In accordance with some aspects a method comprises: for protection groups using data (D) members and parity (P) members, creating a drive subset using (D+P) drives with (D+P) partitions such that protection group members are symmetrically distributed in a matrix of drive rows and partition columns that represents the drive subset; and adding a single new drive having (D+P) partitions to the drive subset by: moving existing protection group members from a selected partition of the (D+P) drives to partitions of the single new drive; and adding protection group members of a new protection group to the selected partition of the (D+P) drives. In some implementations moving existing protection group members from the selected partition of the (D+P) drives to partitions of the single new drive comprises starting with a first or last partition and continuing to an adjacent partition that has not been moved with addition of each successive new drive. In some implementations moving existing protection group members from the selected partition of the (D+P) drives to partitions of the single new drive comprises rotating the selected partition by 90 degrees. In some implementations moving existing protection group members from the selected partition of the (D+P) drives to partitions of the single new drive comprises relocating each existing protection group member at drive Dn of the selected partition of the (D+P) drives to partition Pn of the new drive. Some implementations comprise splitting the drive subset into two drive subsets when the drive subset includes at least (D+P) new drives. In some implementations splitting the drive subset into two drive subsets comprises forming a non-symmetric drive subset from the (D+P) drives. In some implementations splitting the drive subset into two drive subsets comprises forming a symmetric drive subset from the (D+P) new drives.

In accordance with some implementations an apparatus comprises: a plurality of interconnected compute nodes that manage access to a plurality of drives; and a drive manager that: for protection groups using data (D) members and parity (P) members, creates a drive subset using (D+P) drives with (D+P) partitions such that protection group members are symmetrically distributed in a matrix of drive rows and partition columns that represents the drive subset; moves existing protection group members from a selected partition of the (D+P) drives to partitions of a single new drive; and adds protection group members of a new protection group to the selected partition of the (D+P) drives. In some implementations the drive manager moves existing protection group members from the selected partition of the (D+P) drives to partitions of the single new drive starting with a first or last partition and continuing to an adjacent partition that has not been moved with addition of each successive new drive. In some implementations the drive manager moves existing protection group members from the selected partition of the (D+P) drives to partitions of the single new drive by rotating the selected partition by 90 degrees. In some implementations the drive manager moves existing protection group members from the selected partition of the (D+P) drives to partitions of the single new drive by relocating each existing protection group member at drive Dn of the selected partition of the (D+P) drives to partition Pn of the new drive. In some implementations the drive manager splits the drive subset into two drive subsets when the drive subset includes at least (D+P) new drives. In some implementations the drive manager splits the drive subset into two drive subsets by forming a non-symmetric drive subset from the (D+P) drives. In some implementations the drive manager splits the drive subset into two drive subsets by forming a symmetric drive subset from the (D+P) new drives.

In accordance with some implementations a computer-readable storage medium stores instructions that when executed by a computer cause the computer to perform a method for using a computer system to scale a storage system in a single drive increment, the method comprising: for protection groups using data (D) members and parity (P) members, creating a drive subset using (D+P) drives with (D+P) partitions such that protection group members are symmetrically distributed in a matrix of drive rows and partition columns that represents the drive subset; and adding a single new drive having (D+P) partitions to the drive subset by: moving existing protection group members from a selected partition of the (D+P) drives to partitions of the single new drive; and adding protection group members of a new protection group to the selected partition of the (D+P) drives. In some implementations the method further comprises moving existing protection group members from the selected partition of the (D+P) drives to partitions of the single new drive comprises starting with a first or last partition and continuing to an adjacent partition that has not been moved with addition of each successive new drive. In some implementations the method further comprises moving existing protection group members from the selected partition of the (D+P) drives to partitions of the single new drive comprises rotating the selected partition by 90 degrees. In some implementations the method further comprises moving existing protection group members from the selected partition of the (D+P) drives to partitions of the single new drive comprises relocating each existing protection group member at drive Dn of the selected partition of the (D+P) drives to partition Pn of the new drive. In some implementations the method further comprises splitting the drive subset into two drive subset when the drive subset includes at least (D+P) new drives. In some implementations the method further comprises splitting the drive subset into two drive subset comprises forming a symmetric drive subset from the (D+P) new drives.

Other aspects, features, and implementations may become apparent in view of the detailed description and figures.

BRIEF DESCRIPTION OF THE FIGURES

FIG. 3 is a drive subset matrix that represents the drive subset of FIG. 2.

FIG. 4 illustrates a symmetric drive subset matrix formed by adjusting the drive subset matrix of FIG. 3.

FIG. 6 illustrates formation of a single partition protection group using the locations vacated due to rotation of the partition of the symmetric drive subset matrix.

FIG. 7 illustrates formation of a second single partition protection group using the locations vacated due to rotation of a second partition of the symmetric drive subset matrix onto partitions of a second new drive.

FIG. 8 illustrates formation of a third single partition protection group using the locations vacated due to rotation of a third partition of the symmetric drive subset matrix onto partitions of a third new drive.

FIG. 9 illustrates formation of a fourth single partition protection group using the locations vacated due to rotation of a fourth partition of the symmetric drive subset matrix onto partitions of a fourth new drive.

FIG. 10 illustrates formation of a fifth single partition protection group using the locations vacated due to rotation of a fifth partition of the symmetric drive subset matrix onto partitions of a fifth new drive.

FIG. 11 illustrates splitting of the single partition protection groups from the symmetric drive subset matrix formed by the partition rotations resulting from growing the drive subset.

FIG. 12 illustrates rotation of a partition of the split-off symmetric drive subset matrix onto partitions of a new drive and formation of a single partition protection group using the locations vacated due to rotation.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
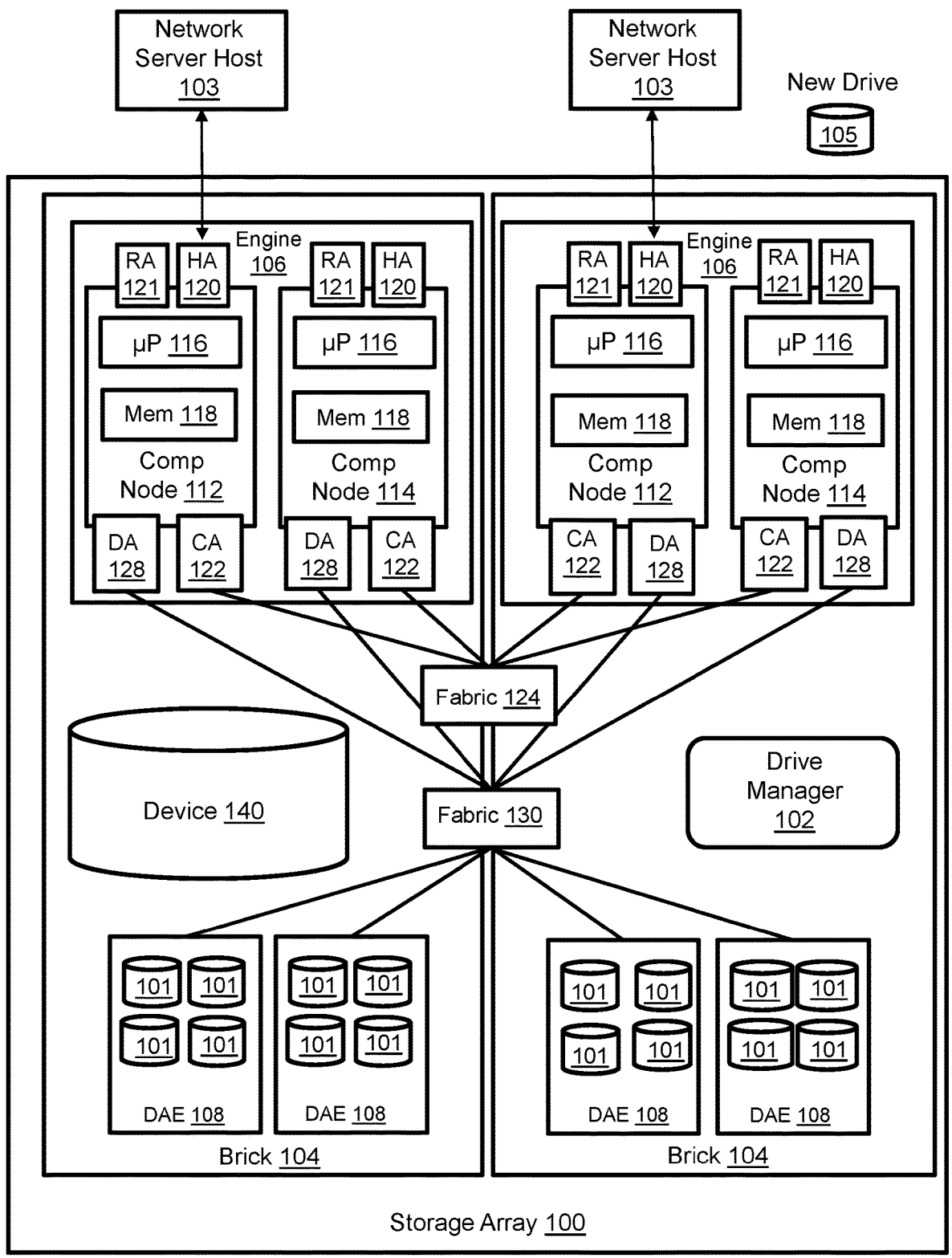
FIG. 1 illustrates a storage array with a drive manager that implements protection groups and manages scaling of storage capacity in single drive increments.

FIG. 1 illustrates a storage array 100 with a drive manager 102 that manages scaling of the storage capacity of storage array protection groups in single drive increments, e.g. adding a single new drive 105. The storage array is one example of a storage area network (SAN), which is one example of a data storage system in which the drive manager could be implemented. The storage array 100 is depicted in a simplified data center environment supporting two network server hosts 103 that run host applications. The hosts 103 include volatile memory, non-volatile storage, and one or more tangible processors. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the storage array. Each compute node also includes a remote adapter (RA) 121 for communicating with other storage systems. Each compute node also includes one or more drive adapters (DAs) 128 for communicating with managed drives 101 in the DAEs 108. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A backend connection group includes all drive adapters that can access the same drive or drives. In some implementations every drive adapter 128 in the storage array can reach every DAE via the fabric 130. Further, in some implementations every drive adapter in the storage array can access every managed drive 101.

Data associated with instances of the hosted application instances running on the hosts 103 is maintained on the managed drives 101. The managed drives 101 are not discoverable by the hosts but the storage array creates a logical storage device 140 that can be discovered and accessed by the hosts. Without limitation, the logical storage device may be referred to as a storage object, source device, production volume, production device, or production LUN, where the logical unit number (LUN) is a number used to identify logical storage volumes in accordance with the small computer system interface (SCSI) protocol. From the perspective of the hosts 103, the logical storage device 140 is a single drive having a set of contiguous fixed-size logical block addresses (LBAs) on which data used by the instances of the host application resides. However, the host application data is stored at non-contiguous addresses on various managed drives 101. The compute nodes maintain metadata that maps between the logical storage device 140 and the managed drives 101 in order to process IOs from the hosts.

Figure 2:
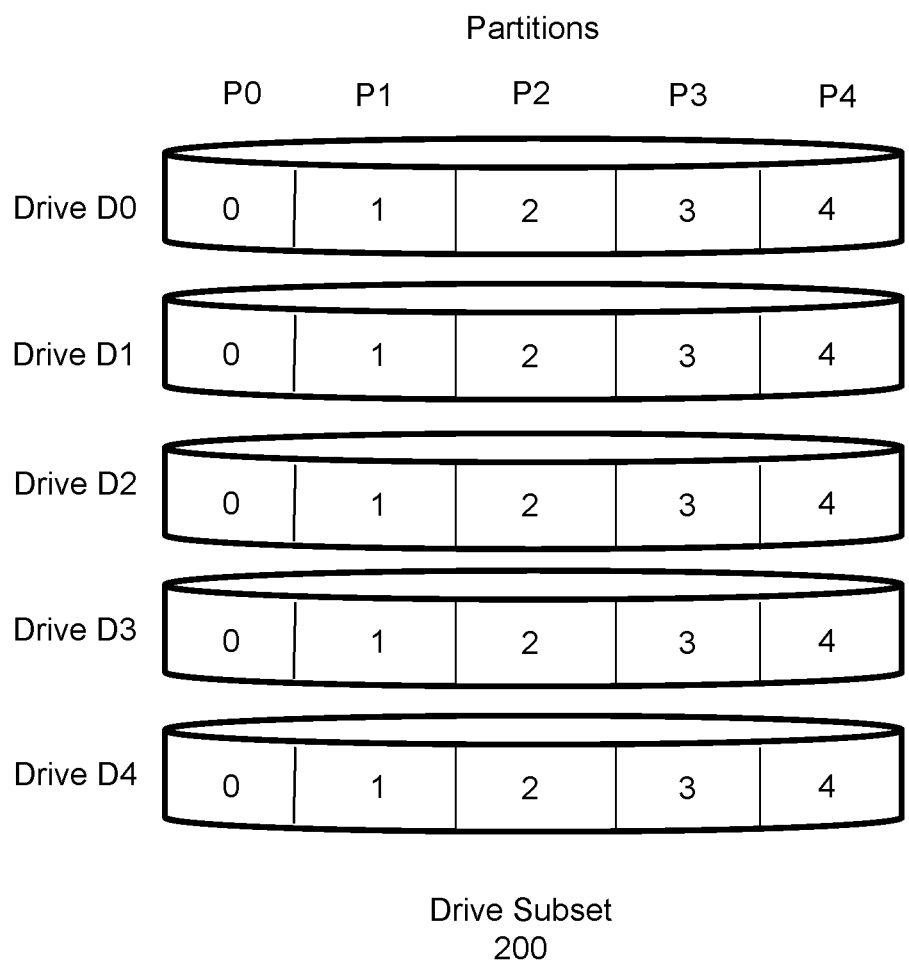
FIG. 2 illustrates a drive subset with single partition protection groups.

Referring to FIG. 2, the set of managed drives 101 (FIG. 1) of the storage array is organized into independent subsets of drives such as drive subset 200. RAID (D+P) protection groups are implemented on each independent drive subset. Each drive subset may initially be created with (D+P) drives and (D+P) partitions. A RAID-5 (4+1) implementation is shown so there are five drives D0-D4 on which five partitions P0-P4 are created. The RAID-5 (4+1) protection groups 0-4 are each based on a single partition. Specifically, members of protection group 0 are each in partition 0 of one of the drives, members of protection group 1 are each in partition 1 of one of the drives, members of protection group 2 are each in partition 2 of one of the drives, members of protection group 3 are each in partition 3 of one of the drives, and members of protection group 4 are each in partition 4 of one of the drives. Operation of the drive manager will be described beginning with the illustrated drive subset 200, but this should not be viewed as a limitation.

FIG. 3 illustrates a drive subset matrix 300 that represents the drive subset 200 of FIG. 2. Specifically, the drive subset matrix 300 represents the associations between the drives D0-D4, partitions P0-P4, and protection group 0-4 members. Matrices are just one example of data structures that may be used by the drive manager to represent the drive subsets.

FIG. 4 illustrates a symmetric drive subset matrix 302 formed by moving selected protection group members in the drive subset matrix 300 of FIG. 3. Movement of protection group members in drive subset matrices used by the drive manager implies corresponding movement of protection group members in the corresponding drive subset. The associations between drive partitions and protection group members is changed by moving protection group members to different drive partitions such that the protection group members in the matrix exhibit symmetry. In the illustrated example the symmetry is relative to a diagonal running from drive D4, partition P0 to drive D0, partition P4. However, other types of symmetry could be implemented. One technique for forming a symmetric drive matrix is to assign a member of a protection group m to a drive partition at row X, column Y of the matrix using the algorithm: $m=(X+Y)\ \text{MODULO}(D+P)$. However, a wide variety of techniques could be used. As will be shown below, symmetry of protection group members in a drive subset facilitates growing and splitting of the drive sub set.

Figure 5:
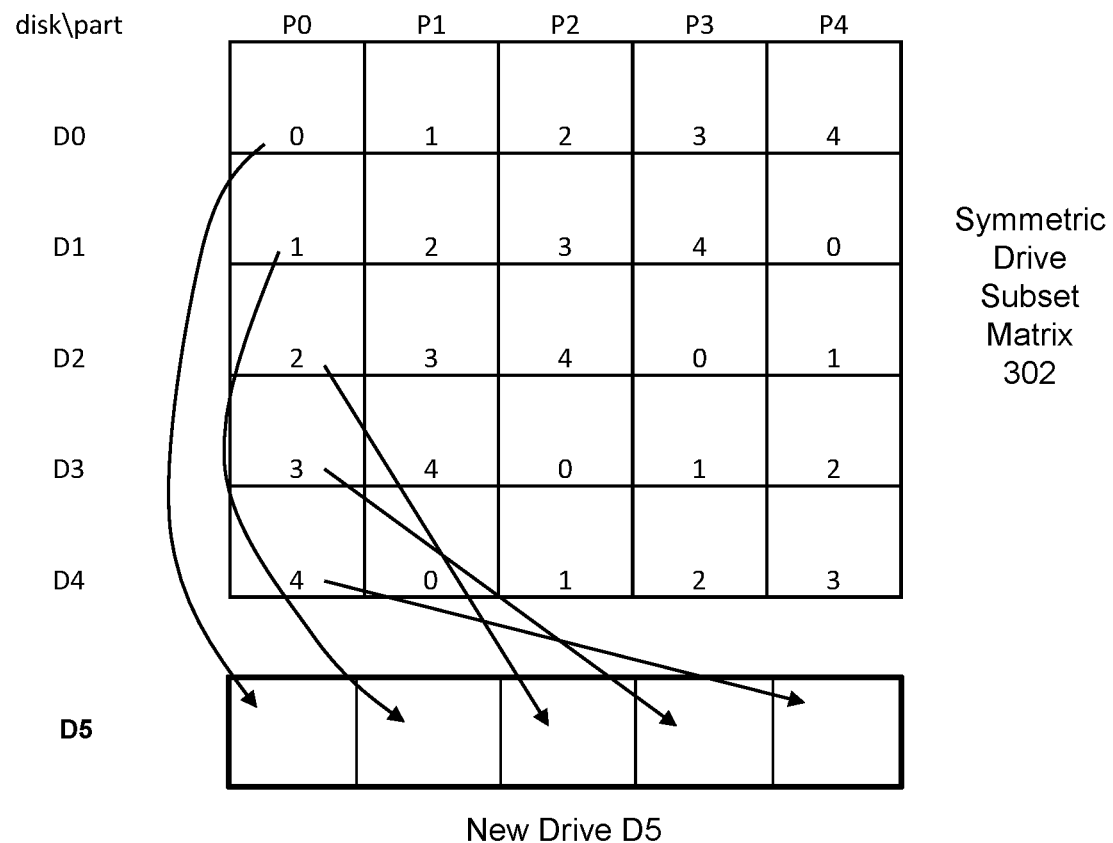
FIG. 5 illustrates rotation of a partition of the symmetric drive subset matrix onto partitions of a new drive.

FIG. 5 illustrates rotation of a partition of the symmetric drive subset matrix 302 onto partitions of a new drive D5. Specifically, partition P0 of drives D0-D4 is rotated 90 degrees into partitions P0-P4 of the new drive D5. Rotation by 90 degrees relocates the protection group member at drive Dn to partition Pn of the new drive. Subsequent rotations will be described below. The process of rotating partitions begins with the first or last column in the matrix and proceeds in series to the last or first column using the adjacent non-rotated column for the next rotation.

FIG. 6 illustrates formation of a single partition protection group using the locations vacated due to rotation of the partition of the symmetric drive subset matrix shown in FIG. 5. Drive subset matrix 304 is formed by the addition of new drive D5 to symmetric drive subset matrix 302 (FIG. 5). Partition P0 of drives D0-D4 is rotated 90 degrees into partitions P0-P4 of the new drive D5, resulting in protection group members 0, 1, 2, 3, 4 being moved to partitions P0, P1, P2, P3, P4 of drive D5. A new protection group is created in vacated partitions. Specifically, protection group 5 is created in partition P0 of drives D0-D4. Consequently, the drive subset, and thus the storage array, is scaled-up in a single drive increment.

FIG. 7 illustrates formation of a second single partition protection group using the locations vacated due to rotation of a second partition of the symmetric drive subset matrix onto partitions of a second new drive. Drive subset matrix 306 is formed by the addition of new drive D6 to drive subset matrix 304 (FIG. 6). Specifically, partition P1 of drives D0-D4 is rotated 90 degrees into partitions P0-P4 of new drive D6 such that the member at drive Dn is moved to partition Pn of the new drive. Members of new protection group 6 are located in partition P1 of drives D0-D4. Consequently, the drive subset, and thus the storage array, is again scaled-up in a single drive increment.

FIG. 8 illustrates formation of a third single partition protection group using the locations vacated due to rotation of a third partition of the symmetric drive subset matrix onto partitions of a third new drive. Drive subset matrix 308 is formed by the addition of new drive D7 to drive subset matrix 306 (FIG. 7). Specifically, partition P2 of drives D0-D4 is rotated 90 degrees into partitions P0-P4 of new drive D7. Members of new protection group 7 are located in partition P2 of drives D0-D4. Consequently, the drive subset, and thus the storage array, is again scaled-up in a single drive increment.

FIG. 9 illustrates formation of a fourth single partition protection group using the locations vacated due to rotation of a fourth partition of the symmetric drive subset matrix onto partitions of a fourth new drive. Drive subset matrix 310 is formed by the addition of new drive D8 to drive subset matrix 308 (FIG. 8). Specifically, partition P3 of drives D0-D4 is rotated 90 degrees into partitions P0-P4 of new drive D8. Members of new protection group 8 are located in partition P3 of drives D0-D4. Consequently, the drive subset, and thus the storage array, is again scaled-up in a single drive increment.

FIG. 10 illustrates formation of a fifth single partition protection group using the locations vacated due to rotation of a fifth partition of the symmetric drive subset matrix onto partitions of a fifth new drive. Drive subset matrix 312 is formed by the addition of new drive D9 to drive subset matrix 310 (FIG. 9). Specifically, partition P4 of drives D0-D4 is rotated 90 degrees into partitions P0-P4 of new drive D9. Members of new protection group 9 are located in partition P4 of drives D0-D4. Consequently, the drive subset, and thus the storage array, is again scaled-up in a single drive increment. At this point all of the columns of the original symmetric drive subset matrix 302 (FIG. 4) have been rotated. Consequently, the drive subset now has 2(D+P) drives, which is a sufficient number of drives to create two separate drive subsets having (D+P) drives.

FIG. 11 illustrates splitting of drive subset matrix 312 (FIG. 10). The single partition protection groups on drives D0-D4 are split from the symmetric portion formed on drives D5-D9 by rotation of partitions while growing the drive subset in single drive increments. Drive subset matrix 314 represents a drive subset of (D+P) drives with single partition protection groups. Symmetric drive subset matrix 316 represents a drive subset of (D+P) drives with symmetry of protection group members.

FIG. 12 illustrates rotation of a partition of the split-off symmetric drive subset matrix 316 (FIG. 11) onto partitions of a new drive and formation of a single partition protection group using the locations vacated due to rotation. Drive subset matrix 318 is formed by the addition of new drive D10 to drive subset matrix 316 (FIG. 11). Specifically, partition P0 of drives D0-D4 is rotated 90 degrees into partitions P0-P4 of new drive D10. Members of new protection group 10 are located in partition P0 of drives D0-D4. Consequently, the drive subset, and thus the storage array, is again scaled-up in a single drive increment.

Figure 13:
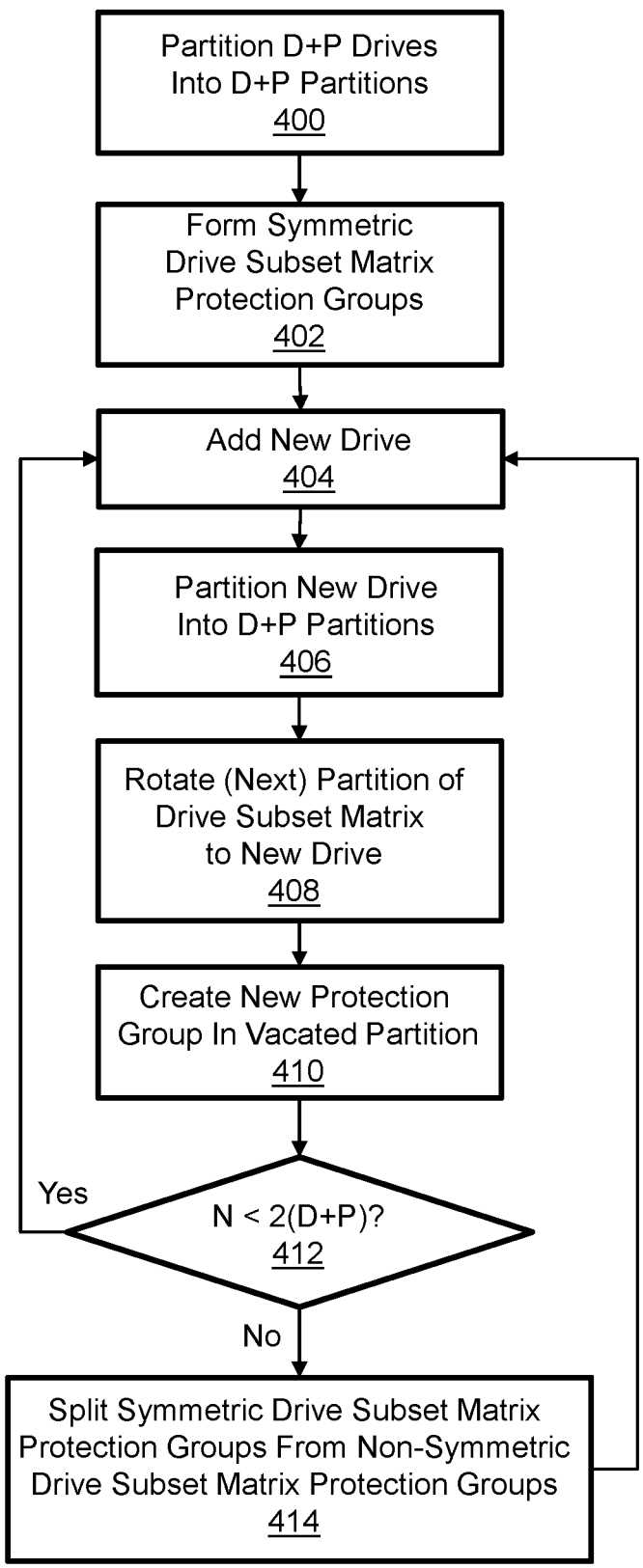
FIG. 13 illustrates operation of the drive manager in greater detail.

FIG. 13 illustrates operation of the drive manager in greater detail. An initial drive subset may be formed by partitioning a group of (D+P) drives into (D+P) partitions as indicated in step 400. A storage array includes multiple drive subsets, but processing of a single drive subset will be described. Symmetric drive subset matrix protection groups are formed as indicated in step 402. As previously indicated, one technique for forming a symmetric drive matrix is to assign a member of a protection group to a drive partition at drive row X, partition column Y of the matrix using the algorithm: protection group m=(X+Y)MODULO(D+P). However, a wide variety of techniques could be used. Step 404 is to add a new drive. Addition of a new drive may be prompted by a need for more total storage capacity. Step 406 is to partition the new drive into (D+P) partitions. Step 408 is to rotate an appropriate partition of the drive subset matrix representing the original (D+P) drives onto the new drive. The process of rotating partitions begins with the first or last column in the matrix and proceeds in series to the last or first column using the adjacent non-rotated column for the next rotation. Rotation by 90 degrees relocates the protection group member at drive Dn to partition Pn of the new drive. Step 410 is to create a new protection group in the partitions that are vacated due to rotation in step 408. Steps 404 through 410 are repeated until at least (D+P) new drives are added. If the total number N of drives in the drive subset matrix is less than 2(D+P) as determined in step 412 then another new drive can be added by repeating steps 404 through 410, selecting the next partition in series to rotate. If the total number N of drives in the drive subset matrix is not less than 2(D+P) as determined in step 412 then the symmetric drive subset matrix protection groups on the (D+P) new drives are split away from the non-symmetric drive subset matrix protection groups on the original (D+P) drives as indicated in step 414. The resulting symmetric drive subset can be scaled-up by repeating steps 404 through 410. It will be appreciated that the symmetric drive subset formed on the new drives due to rotation-growth and split cycles is ready for addition of a new drive. Further, the non-symmetric drive subset on the original (D+P) drives could be prepared to be grown and split by first moving protection group members to form a symmetric drive subset.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
for a plurality of protection groups using data (D) members and parity (P) members, creating a drive subset using (D+P) drives with (D+P) partitions such that protection group members are distributed in a manner represented by a symmetric matrix of drive rows and partition columns that represents the drive subset and wherein the matrix is symmetric such that protection group distribution in a transpose of the symmetric matrix created by interchanging row and column indices matches protection group distribution in the symmetric matrix;
adding, in increments of a single new drive until there are at least (D+P) new drives, new drives having (D+P) partitions to the drive subset by:
moving existing protection group members from a selected partition of the (D+P) drives to partitions of the single new drive by relocating each existing protection group member at drive Dn of the selected partition of the (D+P) drives to partition Pn of the new drive; and
adding protection group members of a new protection group to the selected partition of the (D+P) drives; and
splitting the drive subset into two drive subsets when the drive subset includes at least (D+P) new drives, wherein at least one of the two drive subsets is characterized by protection group member distribution in a manner represented by the symmetric matrix.

2. The method of claim 1 wherein moving existing protection group members from the selected partition of the (D+P) drives to partitions of the single new drive comprises starting with a first or last partition and continuing to an adjacent partition that has not been moved with addition of each successive new drive.

3. The method of claim 1 wherein moving existing protection group members from the selected partition of the (D+P) drives to partitions of the single new drive comprises rotating the selected partition by 90 degrees.

4. The method of claim 1 wherein splitting the drive subset into two drive subsets comprises forming a non-symmetric drive subset from the (D+P) drives.

5. The method of claim 1 wherein splitting the drive subset into two drive subsets comprises forming a symmetric drive subset from the (D+P) new drives.

6. An apparatus, comprising:
a plurality of interconnected compute nodes that manage access to a plurality of drives; and
a drive manager that:
for a plurality of protection groups using data (D) members and parity (P) members, creates a drive subset using (D+P) drives with (D+P) partitions such that protection group members are distributed in a manner represented by a symmetric matrix of drive rows and partition columns that represents the drive subset and wherein the matrix is symmetric such that protection group distribution in a transpose of the matrix created by interchanging row and column indices matches protection group distribution in the matrix, adds, in increments of a single new drive until there are at least (D+P) new drives, new drives having (D+P) partitions to the drive subset;
moves existing protection group members from a selected partition of the (D+P) drives to partitions of the single new drive by relocating each existing protection group member at drive Dn of the selected partition of the (D+P) drives to partition Pn of the new drive;
adds protection group members of a new protection group to the selected partition of the (D+P) drives; and
splits the drive subset into two drive subsets when the drive subset includes at least (D+P) new drives, wherein at least one of the two drive subsets is characterized by protection group member distribution in a manner represented by the symmetric matrix.

7. The apparatus of claim 6 wherein the drive manager moves existing protection group members from the selected partition of the (D+P) drives to partitions of the single new drive starting with a first or last partition and continuing to an adjacent partition that has not been moved with addition of each successive new drive.

8. The apparatus of claim 6 wherein the drive manager moves existing protection group members from the selected partition of the (D+P) drives to partitions of the single new drive by rotating the selected partition by 90 degrees.

9. The apparatus of claim 6 wherein the drive manager splits the drive subset into two drive subsets by forming a non-symmetric drive subset from the (D+P) drives.

10. The apparatus of claim 6 wherein the drive manager splits the drive subset into two drive subsets by forming a symmetric drive subset from the (D+P) new drives.

11. A non-transitory computer-readable storage medium storing instructions that when executed by a computer cause the computer to perform a method for using a computer system to scale a storage system in a single drive increment, the method comprising:
for a plurality of protection groups using data (D) members and parity (P) members, creating a drive subset using (D+P) drives with (D+P) partitions such that protection group members are distributed in a manner represented by a symmetric matrix of drive rows and partition columns that represents the drive subset and wherein the matrix is symmetric such that protection group distribution in a transpose of the matrix created by interchanging row and column indices matches protection group distribution in the matrix; and
adding, in increments of a single new drive until there are at least (D+P) new drives, new drives having (D+P) partitions to the drive subset by:
moving existing protection group members from a selected partition of the (D+P) drives to partitions of the single new drive by relocating each existing protection group member at drive Dn of the selected partition of the (D+P) drives to partition Pn of the new drive; and
adding protection group members of a new protection group to the selected partition of the (D+P) drives; and
splitting the drive subset into two drive subsets when the drive subset includes at least (D+P) new drives, wherein at least one of the two drive subsets is characterized by protection group member distribution in a manner represented by the symmetric matrix.

12. The non-transitory computer-readable storage medium of claim 11 wherein the method further comprises moving existing protection group members from the selected partition of the (D+P) drives to partitions of the single new drive comprises starting with a first or last partition and continuing to an adjacent partition that has not been moved with addition of each successive new drive.

13. The non-transitory computer-readable storage medium of claim 11 wherein the method further comprises moving existing protection group members from the selected partition of the (D+P) drives to partitions of the single new drive comprises rotating the selected partition by 90 degrees.

14. The non-transitory computer-readable storage medium of claim 11 wherein the method further comprises splitting the drive subset into two drive subsets comprises forming a symmetric drive subset from the (D+P) new drives.

* * * * *